United States Patent [19]

Messenger

[11] Patent Number: 5,046,066
[45] Date of Patent: Sep. 3, 1991

[54] WIRELESS LOCAL AREA NETWORK

[75] Inventor: Steven Messenger, Scarborough, Canada

[73] Assignee: Telesystems SLW Inc., Don Mills, Canada

[21] Appl. No.: 13,936

[22] Filed: Feb. 12, 1987

[30] Foreign Application Priority Data

Feb. 9, 1987 [CA] Canada .................................. 529275

[51] Int. Cl.$^5$ ............................................ G06F 13/00
[52] U.S. Cl. ..................... 370/94.1; 370/18; 370/95.2; 375/40; 364/940.62; 364/935.7
[58] Field of Search ... 364/200 MS File, 900 MS File; 370/14, 85, 18, 94, 95; 455/33; 375/1, 40, 100

[56] References Cited

U.S. PATENT DOCUMENTS

| | | | |
|---|---|---|---|
| 4,398,259 | 8/1983 | Schoute | 370/93 |
| 4,481,670 | 11/1984 | Freeburg | 455/33 |
| 4,493,021 | 1/1985 | Agrawal et al. | 364/200 |
| 4,525,861 | 6/1985 | Freeburg | 455/33 |
| 4,545,071 | 10/1985 | Freeburg | 455/33 |
| 4,590,473 | 5/1986 | Burke | 340/825.52 |
| 4,639,914 | 1/1987 | Winters | 370/110.1 |
| 4,663,748 | 5/1987 | Karbowiak et al. | 370/89 |
| 4,665,519 | 5/1987 | Kirchner et al. | 370/94 |
| 4,672,658 | 6/1987 | Kavehrad et al. | 379/63 |
| 4,697,263 | 9/1987 | Beaufoy | 370/85 |
| 4,742,514 | 5/1988 | Goode et al. | 370/109 |
| 4,787,082 | 11/1988 | Delaney et al. | 370/85 |
| 4,807,222 | 2/1989 | Amitay | 370/85 |
| 4,845,609 | 7/1989 | Lighthart et al. | 364/200 |
| 4,866,732 | 9/1989 | Carey et al. | 375/1 |
| 4,941,207 | 7/1990 | Maeda et al. | 455/617 |

OTHER PUBLICATIONS

"Performance Of Direct Sequence Spread Spectrum for Indoor Wireless Digital Communication" (Kavehrad & McLane, 1985, ed. IEEE).
"Applications of Spread-Spectrum Radio to Wireless Terminal Communications" (Freret et al., 1980, IEEE).

Primary Examiner—Gareth D. Shaw
Assistant Examiner—Maria Napiorkowski
Attorney, Agent, or Firm—Mirek A. Waraksa

[57] ABSTRACT

A local area network permits wireless transfer of digitized data among data processing machines in the interior of a building. The network includes a base station which may commonly be associated with shared network resources such as a host computer, print servers and file servers and a plurality of local stations each associated with a data processing machine such as a dumb terminal dependent on the host computer. The base station polls each local station to initiate a transmission of data to the base station. All data including request for data is transmitted as temporally spaced-apart packets spread spectrum modulated according to a pseudo-random noise code common to all stations and encoded onto an RF carrier which is common to all stations. The transmitted data packets include a synchronization code which permits proper spread spectrum decoding without loss of relevant data. The base station uses one of three spaced-apart antennas for transmission of data to each of the local stations and records for each local station the antenna last used for data transfer. If an insufficient number of successful transmissions occur between successive transmission errors, the base station selects a different antenna for further transmissions and effectively updates its recorded information regarding the antenna used. Accordingly, with RF obstructions such as persons passing between the base station and a local station, the base station hunts for an alternative transmission path to maintain communications with the local station.

3 Claims, 8 Drawing Sheets

WIRELESS LOCAL AREA NETWORK

FIELD OF THE INVENTION

The invention relates generally to the transfer of digitized data among data processing equipment in an office or other confined environment.

DESCRIPTION OF THE PRIOR ART

It is known that data processing equipment in an office can be coupled by twisted-pair cables or coaxial cables to permit transfer of data. Such an arrangement might commonly be used to place dumb terminals in communication with common resources such as a host computer, print servers and file servers, but might also be used to permit communication between the various terminals themselves. Such an arrangement is often referred to as a "local area network". For purposes of this specification, this term should be understood as designating any data communication means use in an office environment or more generally in the interior of a building to permit transfer of digitized data between data processing machines. In some instances, parts of such a local area network may in fact be installed in the data processing equipment itself, a very common arrangement in connection with personal computers.

A problem with such prior arrangements is that cables must be extended to each data processing station sharing the local area network. In new office premises, prior to installation of partitions and office furnishings, it is possible to make provision for such cables. In existing office premises, however, installation of such a local area network normally involves disruption of existing fixtures and considerable expense and inconvenience. In either case, subsequent modification of the local area network to accommodate the relocation of data processing equipment or the expansion of the number of network users is difficult and inconvenient.

It is readily apparent that such wiring problems can be overcome by using a radio link to transmit data among items of data processing equipment. Radio links are commonly used to transmit data over open terrain between remotely-located stations. To the knowledge of the inventor, however, no practical wireless local area network using radio frequency communications has been commercially implemented to date despite the obvious advantages of not requiring the modification of office fixtures and of simple expansion and alteration.

The confined environment of an office building creates a number of unique problems for use of radio frequency communication channels in local area networks. In particular, the proximity of data processing equipment in the local area network of a particular office may itself give rise to radio interference and transmission errors. This problem is further complicated if a number of tenants are allowed to operate radio-linked networks as there is a tendency for any equipment tuned to receive particular radio transmissions to respond to some degree to differently coded transmissions. Because the separation of transmitting equipment in a building is of necessity very limited, background transmissions might be expected to have sufficient spectral intensity to introduce transmission errors which are not tolerable in the transmission of digitized data. This problem may become particularly acute if a local station in a particular tenant's network is physically closer to transmitting units in another tenants' offices than to the transmitting units of its own network, a situation which is very apt to occur in office complexes. Timing transmissions throughout a building to avoid simultaneous transmission and interference is not only impractical, but would severely limit data transmission rates in all networks. Also, because of the nature of an office environment and the distinct possibility of multiple reflection of a transmitted signal from walls and furniture and consequently the likelihood of a multiplicity of different travel times between a transmitter and receiver, a single transmission is apt to interfere with itself. This is difficult to compensate as movement of equipment or furnishings in an office can change the nature of the transmission paths between items of equipment and the nature of such interference. Lastly, persons moving through open spaces between data processing equipment may obstruct data transmissions in a very unpredictable manner.

The problems associated with radio frequency communications in an office environment have lead to alternative approaches. These include the use of optical frequency carriers to convey data between processing stations in a network. These require that a direct line of sight be maintained between a transmitter and a receiver, and this problem may be solved by locating the transmitter and receiver above office furnishing or the like adjacent to ceilings. However, such measures restrict the manner in which an office may be organized.

Proposals have been made to transmit data over power lines normally located in an office and required to operate data processing equipment. Such an arrangement is dependent on the nature of the power lines including transformers and the like which may in effect isolate certain areas of an office from others. Also, conventional lighting control devices such as dimmers may introduce high frequency noise which cannot be readily accommodated. Lastly, the cables used in power systems are normally inappropriate for high frequency data transmission and unduly restrict data transfer.

Another approach which has in fact been commercially implemented in recent years and appears to be the principal approach currently taken to avoiding wiring an office for digitized data transfer is sometimes referred to as "data-over-voice" (DOV). In such a system, digitized data signals are transmitted over interoffice telephone lines in a manner which does not disrupt normal voice communications. This approach avoids the problems associated with use of radio frequency links. However, conventional telephone lines although preferable to conventional electric power wiring do restrict data transfer rates. Although re-wiring of an office for purposes of networking data processing equipment is to some extent avoided, such systems do restrict the portability and location of data terminals as telephone outlets must be conveniently available.

SUMMARY OF THE INVENTION

In one aspect, the invention provides a local wireless area network comprising a base station, and a plurality of local stations adapted to transfer digitized data to and from data processing equipment such as dumb terminals or personal computers. Data is transmitted between network stations in the form of temporally spaced-apart data packets on a carrier frequency which is common to all stations. The base station regulates packet transmission by the local stations by transmitting polling packets that initiate packet transmission by the local stations. Each station includes means for spread spectrum modulating each data packet transmitted by the station according to a predetermined pseudo-random noise code common to all the stations. Each station inserts into each transmitted data packet a spread spectrum synchronizing code which is preferrably composed of code bits from the predetermined pseudo-random noise signal. Each station comprises decoding means for decoding data packets received by the station including spread spectrum demodulation means for spread spectrum demodulating the data packets according to the predetermined pseudo-random noise code, these demodulating means including means responsive to the spread spectrum synchronizing code contained in each data packet for synchronizing the spread spectrum demodulation. Accordingly, an item of data processing equipment can be connected to a network station to permit wireless transmission of digital data to another item of data processing equipment connected to another network station. As apparent in a preferred embodiment below, the base station may optionally be connected to data processing equipment such as a host computer and other shared system resources so that terminals connected to the local stations can access the shared system resources without wired connection thereto. The term "wireless" as used in this disclosure and in the appended claims in respect of a network should be understood as meaning that data is transferred between the various stations of a network through air on electromagnetic carriers and is not intended to indicate how data is necessarily transferred within a particular station itself or to data processing equipment coupled to the station.

In another aspect, the invention provides a local area network for wireless transfer of digitized data within the interior of a building. The local area network includes a base station which regulates the transmission of data and a plurality of local stations.

The base station includes packet assembling means for assembling data packets from data received by the base station. This data may be received from common network resources optionally associated with the base station such as a host computer, print servers or files servers, but may also be data in packet form transmitted to the base station by the local stations for retransmission (as for transmission to another local station or to an external system). The packet assembling means include means for inserting into the assembled data packets codes identifying destination stations among the local stations for the assembled data packets. Storage means are provided to store data packets assembled received by the base station.

The base station includes transmitting means for transmitting the stored data packets to the local stations. The transmitting means including encoding means for encoding the stored data packets prior to transmission. These encoding means include spread spectrum modulation means for spread spectrum modulating the data packets according to a predetermined pseudo-random noise code common to the network and radio frequency modulation means for modulating the data packets onto a radio carrier of predetermined frequency common to the network. The encoding means may also include differential phase shift key modulators or other encoders. The base station also includes means for placing a synchronizing code into the data packets for purposes of implementing timely spread spectrum demodulating without data loss.

The base station also includes receiving means for receiving data packets transmitted on a radio frequency carrier of the predetermined carrier frequency from the local stations. The receiving means may include decoding means for decoding the received data packets according to whatever encoding schemes are inherent in the network's radio transmission of digitized data. The decoding means include radio frequency demodulation means for demodulating the received signal from the radio frequency carrier and spread spectrum demodulation means for spread spectrum demodulating the received signal according to the predetermined pseudo-random noise signal, as the local stations would normally implement encoding techniques complementary to those of the base station. The spread spectrum demodulation means including means for synchronizing the spread spectrum demodulation in response to a synchronizing code contained in the received data packets.

Lastly, the base station has control means for regulating the transfer of data packets between the storage means and the local stations. These control means may typically be responsible for periodic polling of the local stations with poll packets that initiate data transmission to the base station, and may perform any required error detection routines. More generally, the control means maintain temporally spaced-apart transmission of data packets so that simultaneous transmissions by stations do not occur.

Each of the local stations has packet assembling means for assembling data packets from data received by the local station as from an associated dumb terminal, personal computer or the like. The packet assembling means include means for inserting into assembled data packets a code identifying the local station which assists the base station in regulating transmissions. Packet storage means are provided to store data packets assembled by the local station or received by the local station from the base station.

The local station has packet transmitting means for transmitting stored data packets to the base station. These transmitting means including encoding means for encoding the stored data packets prior to transmission in the manner appropriate for communications between the local station and the base station. The encoding means include spread spectrum modulation means for spread spectrum modulating the data packets according to the predetermined pseudo-random noise code and radio frequency modulation means for modulating the data packets onto a radio carrier of the predetermined frequency. The local station also includes means for inserting into each data packet prior to transmission a synchronizing code enabling the base station to properly spread spectrum demodulate the transmitted packets.

The local station has receiving means for receiving data packets transmitted from the base station. The receiving means include decoding means for decoding the received data packets, the decoding means including radio frequency demodulation means for demodulating the received signal from the radio frequency carrier and spread spectrum demodulation means for spread spectrum demodulating the received signal. As in the base station, the spread spectrum demodulation means include means for synchronizing the spread spectrum demodulation in response to a synchronizing code contained in the received data packets.

Lastly, the local station has control means for regulating the transfer of data packets between its storage means and the base station. The local station control means are adapted to recognize the address codes contained in the data packets transmitted by the base station and to discard data packets addressed to other stations. The control means also arrange for transmission of a data packet to the base station in response to the receipt of a polling packet.

Various benefits and advantages associated with the invention will be described more fully below in connection with a description of a preferred embodiment and other inventive aspects will be more specifically defined in the appended claims.

DESCRIPTION OF THE DRAWINGS

The invention will be better understood with reference to drawings in which.

In the drawings, arrows have been used to indicate the direction of data flow.

DESCRIPTION OF PREFERRED EMBODIMENT

Figure 1:
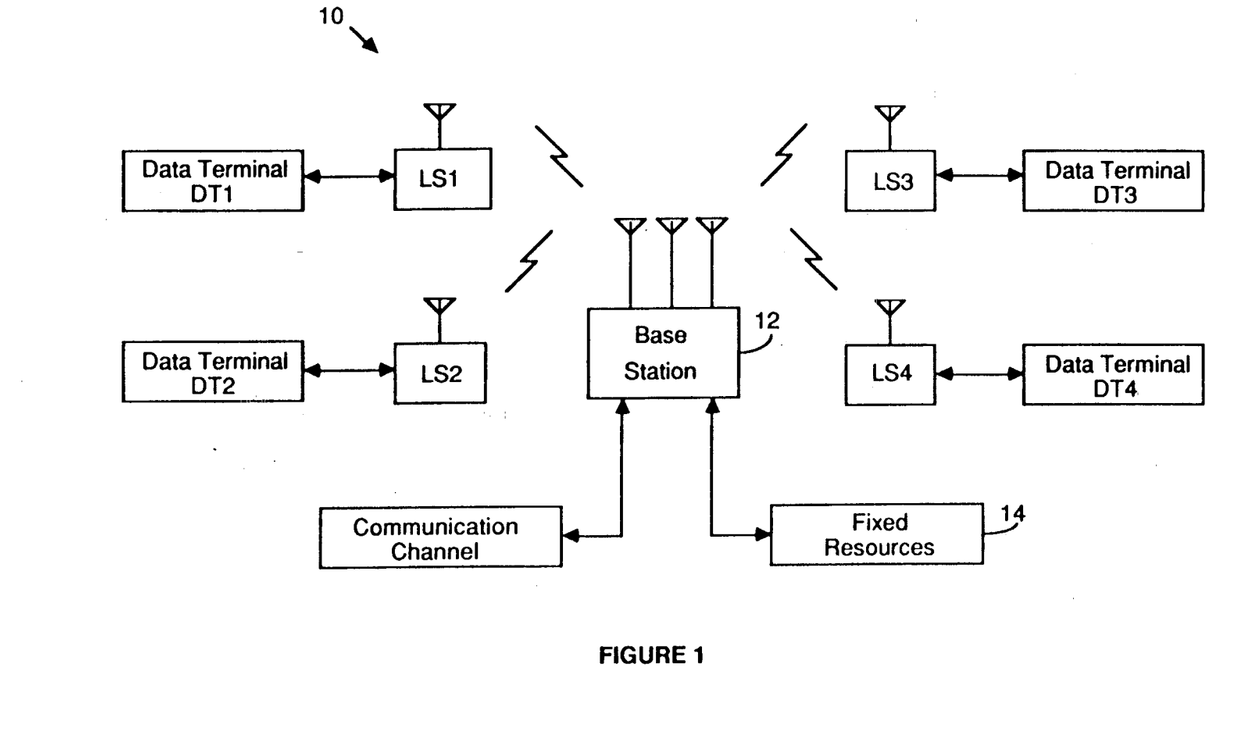
FIG. 1 diagrammatically illustrates the overall configuration of a local area network according to the invention.

Reference is made to FIG. 1 which illustrates the general configuration of a local area network 10 embodying the invention. The network 10 includes a base station 12 whose function is to regulate transmission of digitized data in this instance among four local stations LS1-LS4. The base station 12 may be conveniently coupled to fixed resources 14 comprising a host computer, print servers and file servers which are to be shared by the local area network 10 and, more specifically, shared by various data terminals DT1-DT4 connected to the local stations LS1-LS4. In effect, a computer system is provided in which data terminals DT1-DT4 access a host computer and other common system resources. The base station 12 also has access to a communication channel permitting transfer of data between each local station and resources located in other local area networks.

In the local area network 10, all data transfers to and from the local stations are in the form of packets. These packets are spread spectrum encoded or modulated prior to transmission with a predetermined pseudo noise (PN) code to effect a spreading of the spectral content of the packets. The encoded packets are then modulated with an RF carrier having a predetermined frequency. The local stations and the base station 12 are equipped as described more fully below to encode and decode such data packets.

The base station 12 regulates all data transmission by the local stations by transmitting polling packets. These polling packets are uniquely addressed to a particular station and trigger transmission of a polling-response packet within a predetermined period of time. The polling packet may simply query the local station for transmission of data from the local staion but the polling packet may also contain data which is to be transferred from the common resources 14 associated with the base station 12 to the particular local station. Each local station responds by decoding the polling packet, determining whether it has been addressed, and, if addressed, transmitting a poll-response packet to the base station 12. If the local station elects to transmit data, the polling-response packet will take the form of a properly formatted packet identifying the destination for the data, such as the host computer, printer or disk drive. Alternatively, the local staion will transmit an empty packet simply acknowledging error-free receipt of the polling packet. No local station transmits data except in response to a base station polling packet.

Figure 2:
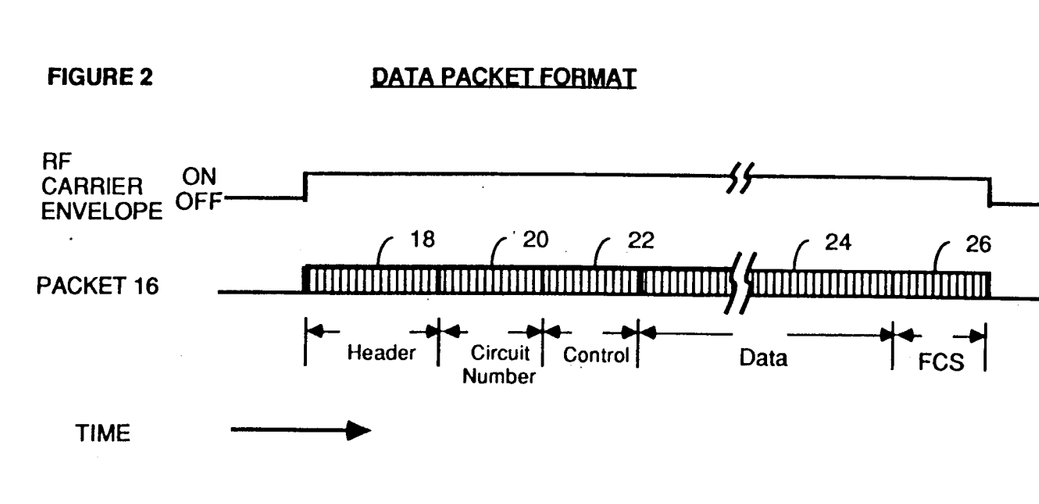
FIG. 2 diagrammatically illustrates the format of data packets used in data transfer in the local area network.

The format of a typical data packet 16 used in the local area network 10 is illustrated in FIG. 2. The data packet 16 has a header 18 which consists of a predefined repetitive synchronizing sequence of sufficient duration to allow detecting equipment associated with each station to synchronize to the PN code sequence used to spread spectrum modulate the packet. This arrangement incidentally assists in synchronizing to the RF carrier use by any station as the carrier is turned off between transmissions to allow other stations complete access to the transmission channel and reduce possible interference between stations. A circuit field 20 serves to identify either the local station which is transmitting a polling-response packet or in the case of a transmission from the base station 12 the particular destination station among the local stations. A control field 22 provides a vehicle for passing link management information such as packet sequence numbers which permit detection and discarding of duplicate packets and which permit a local station to detect whether the base station has received a transmitted data packet thereby permitting previously transmitted packets to be systematically discarded from memory units associated with the local station. A data field 24 is provided which in fact contains any data which is to be transported. A frame check sequence 26 is included to permit a cyclic redundancy test to be performed at the station receiving the packet 16. To permit use of variable size packets, flag bits may be inserted to mark the beginning of the circuit number 20 and the end of the packet 16 itself.

The overall configuration and general operation of the base station 12 will be described with reference to FIG. 3. The base station 12 includes four random access memory (RAM) buffers 28 (in reality a single buffer unit effectively partitioned to define four distinct buffers) which serve to store data packets, and another RAM unit which constitutes a transaction table 30 that records the location of data packets in the RAM buffers 28, including the locations of the packets first stored and last stored. The transaction table 30 in effect creates a transmission queue which a transaction processor 32 periodically interrogates to determine which data packet should next be selected for transmission. The transaction processor 32 performs a parallel-to-serial conversion of the selected packet and directs the data bits to one of three transceivers TR1, TR2 TR3, such as the transceiver TR1.

Figure 3:
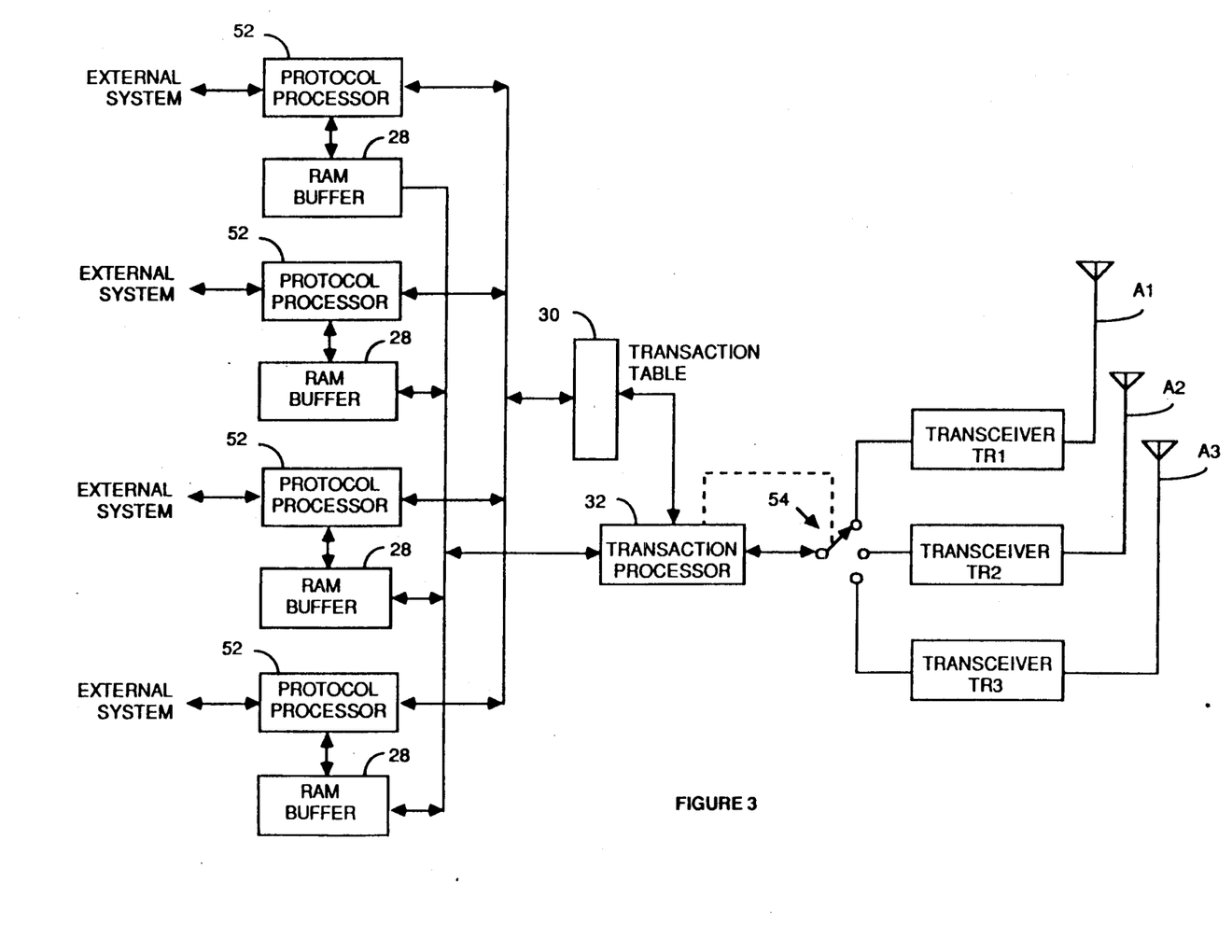
FIG. 3 diagrammatically illustrates the overall configuration of a base station.
Figure 4:
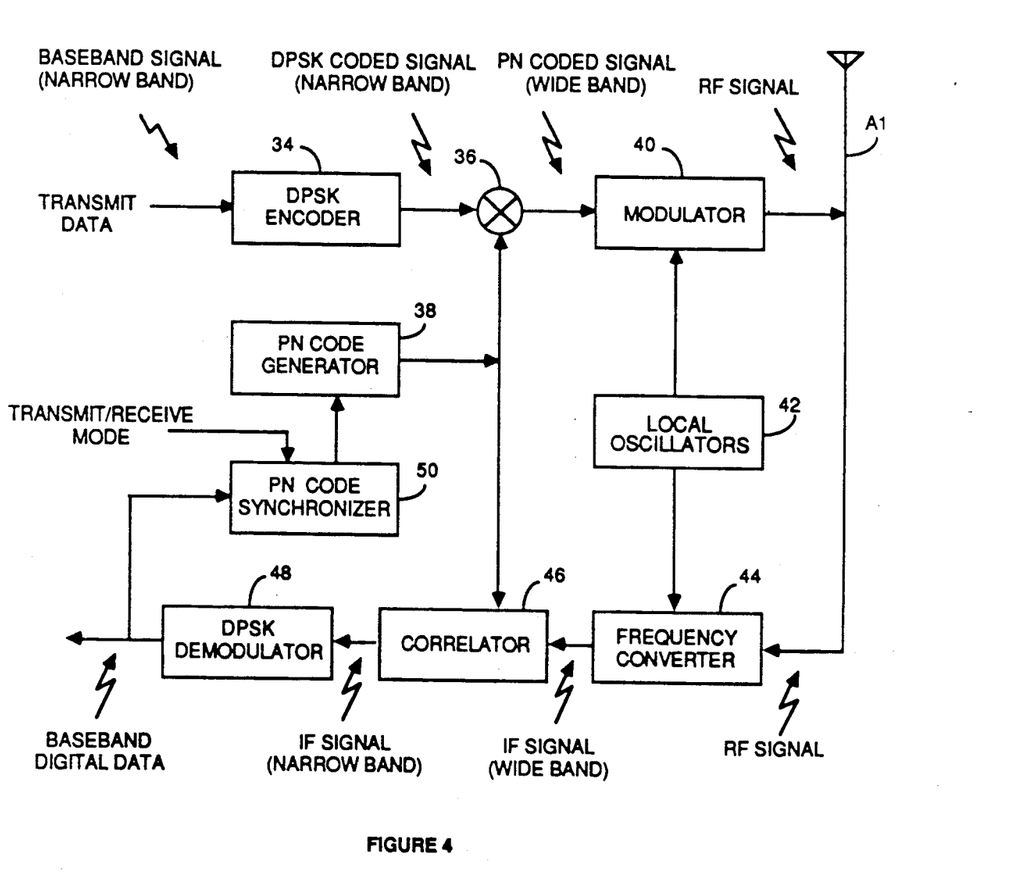
FIG. 4 diagrammatically illustrates a transceiver associated with the base station.
Figure 6:
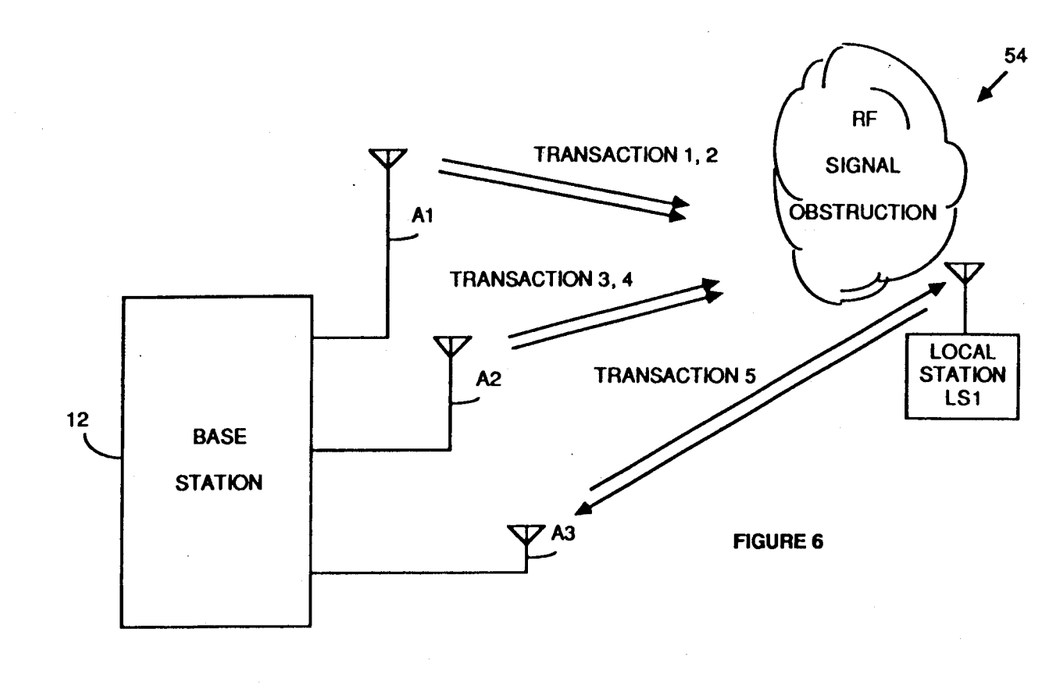
FIG. 6 diagrammatically illustrates how the base station overcomes an RF signal obstruction to transmit to a local station.

The transceiver TR1 which is typical is associated with the antenna A1, one of three spaced-apart antennas associated with the base station 12, the other two antennas being designated with reference characters A2, A3, as apparent in FIGS. 3 and 6. In a transmission mode, the serial bits of the data packet are differentially encoded in a conventional manner by a differential encoder 34. A gate 36 then performs an exclusive OR (XOR) of the resultant signal with a predetermined higher speed digital sequence having the statistical characteristics of random noise, generated by a local PN code generator 38. This produces a wide band signal which is then encoded by a modulator 40 onto a RF carrier signal of the common frequency referred to above produced by local oscillators 42. The resultant RF signal is then transmitted by the antenna A1.

In a receiving mode, the incoming signal produced by the modulator 40 from a local station, which is known to be carried by an RF carrier of the common frequency is down-converted by a frequency converter (technically a balanced mixer) 44 in a conventional manner using signals generated by the local oscillators 42 to produce an wide band IF signal. The IF signal which is known to have been spread spectrum modulated according to the common pseudo-noise sequence is then correlated by means of a correlator (technically another balanced mixer) 46 with the same sequence as generated by the local PN code generator 38 with a view to collapsing the spectrum of the signal to produce an IF narrow band signal, eliminating in the process much of the wide band noise which may typically corrupt the incoming signal. The resulting signal is received by a differential phase shift demodulator 48 to produce the desired base band data signal (bits of the received packet in serial form). A PN code synchronizer 50 samples the base band signal and adjusts the phase of the locally generated PN code in a conventional manner to ensure proper decoding. The PN code synchronizer 50, although capable of synchronizing to any one of the multiple reflections of a given transmission, is in fact adapted in a conventional manner to lock onto the strongest signal transmission. The header field incorporated into the data packet permits proper synchronization prior to decoding of any relevant data, thereby reducing the otherwise strong likelihood of data errors. The transaction processor 32 then accepts and stores this poll-response packet in the RAM buffers 28 to await further processing. The transaction processor 32 also performs a cyclic redundancy check based on the packet's frame check sequence and indicates in the transaction table 30 whether a transmission error has occurred in connection with the particular received packet.

The manner in which a PN synchronizing code is inserted into each transmitted data packet should be noted. Immediately prior to directing the bits of an assembled data packet from the RAM buffers 28 to the transceiver TR1, the transaction processor 32 places the PN synchronizer in a transmission mode. The PN synchronizer responds by causing the PN code generator to generate code bits which are appropriately encoded and transmitted immediately prior to the packet bits stored in the RAM buffer. These code bits form a very simple and reliable synchronizing signal as they are not associated with the spread spectrum encoding of any data. It is possible to store synchronizing codes directly with the packet data otherwise stored in the RAM buffers 28; however, such an arrangement is wasteful of buffer space.

The base station 12 also includes four protocol processors 52. One protocol processor 52 would normally be provided for each local station in communication with the base station 12. These protocol processors 52 may in fact be physically separate circuits but in this embodiment are virtual machines operated by a single microprocessor appropriately programmed to effectively provide the appearance of four independently operating machines. These have accordingly been designated with a single reference numeral.

One function of the protocol processors 52 with respect to transmissions in the local area network 10 is to respond to transmission errors. The protocol processors 52 scan the transaction table 30 to determine whether the transaction processor 32 has recorded therein a transmission error in connection with the most recently received poll-response packet. If such an error has occurred, the protocol processors 52 will discard the received packet from the RAM buffers 28 and immediately relocate the polling packet which resulted in the particular poll-response packet at the bottom of the transmission queue. The absence of any poll-response packet, as with an RF obstruction, is treated essentially as any other transmission error.

The protocol processors 52 are also instrumental in accommodating RF path obstructions. The three antennas associated with the base station 12 allow for alternative transmission paths between the base station 12 and any local station. The protocol processors 52 store in the RAM buffers 28 for each local station a code indicating the antenna to be used to transfer data to and from the local station. The transaction processor 32 responds to the antenna code stored in the transaction table 30 each time a polling packet for the local station is to be transmitted by actuating a path gating switch 50 which directs the stream of packet bits produced by the transaction processor 32 to the required transceiver and antenna pair. If an RF obstruction occurs, the transaction processor 32 will not receive poll-response packets from a local station despite repeated attempts to poll the particular local station. The protocol processors 52 will in such circumstances take steps to change the transmission path being used by effectively selecting another antenna for transmission and receipt of packets and updating the recorded antenna code for the particular local station. In response to continuing transmission errors with respect to a particular local station, the protocol processors 52 will step through the various transceiver and antenna pairs in a preselected order, hunting for a suitable transmission path (which with some RF obstructions may not be found).

It will be noted that three identical transceivers TR1-TR3 have been illustrated. It is possible to employ a single transceiver and to provide an appropriate antenna switching means at the output of the single transceiver. In practice, however, it may prove less expensive to duplicate transceivers than to provide a switch at the antennas which would have to operate at RF frequencies.

The protocol processors 52 do not change the antenna used for transmission of data to and from a local station in response to each transmission error. Errors in transmission may be expected to occur even along the best transmission path. If two of the transmission paths provide very poor performance due to office conditions, it would be undesirable for the transmission antenna to be switched in response to statistically acceptable error rates, as the system may begin to hunt periodically through the antennas thereby resulting in a large number of repeated poll packet transmissions and poor data transfer rates. The protocol processors 52 are programmed to avoid such situations by responding to the number of polling response packets successfully received between successive transmission error using a particular antenna. This data is stored by the protocol processors 52 in the buffer RAM for transmissions to each of the local stations. An appropriate criterion for changing of antennas would be less than 9 successfully transmitted poll-packets and received poll-response packets between transmission errors.

Figure 7:
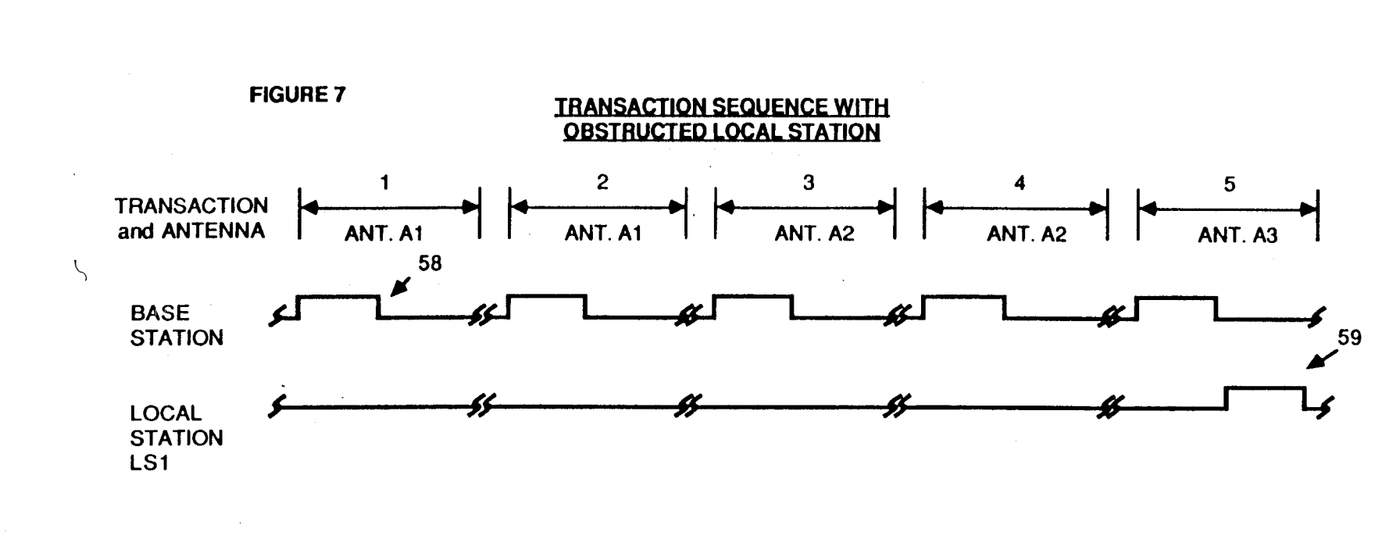
FIG. 7 illustrates an exemplary sequence of data exchange transactions occurring between the base station and the local station in response to the RF signal obstruction; and, FIG. 8 illustrates how a number of local area networks may be connected for transmission of data between local stations located in different networks.

An RF obstruction 54 is symbolically illustrated in FIG. 6 and a typical sequence of transactions with the obstructed local station (arbitrarily assumed to be the station LS1) is illustrated in FIG. 7 where the transmission of polling packets, polling response packets and changes in antenna selection are illustrated in chronological order from left-to-right. The RAM buffers 28 may initially store a code identifying antenna A1 as an appropriate antenna for transmission of data to and from the station LS1. Using the antenna A1, no response is received to a first transmission of a polling packet 58. No response is received to a second transmission of the packet 58 (less than 9 successful transmission between lost packets) and the protocol processors 52 now increment the code recorded in the RAM buffers 28 identifying the antenna A2 for use in connection with transmissions to the local station LS1. This information is inserted into the polling packet 58 which is once again placed in the transmission queue. The protocol processors 52 also reset the packet 58 transmission count stored in the RAM buffers 28 to start counting successful and unsuccessful transmissions once again. During the third transmission of the polling packet 58, the transaction processor 32 responds to the changed antenna code in the stored polling packets and switches transmission to the antenna A2. This once again produces no poll-response packet owing to the RF obstruction 54. The protocol processors 52 respond to the transmission error occurring from this first use of the antenna A2, noting a new first transmission error and by reinserting the polling package into the transmission queue. This once again produces no poll-response packet. Since two transmission errors have occurred with respect to the second antenna A2, the protocol processors 52 increment the antenna code in both the stored polling packet 58 and the appropriate location in the RAM buffer thereby identifying the antenna A3 and reinsert the polling packet 58 into the transmission queue. The transaction processor 32 now transmits the polling packet 58 using the third antenna A3, overcoming the RF obstruction 54, and causing the local station LS1 to transmit a polling-response packet 59. The third antenna A3 remains identified as appropriate for all subsequent data transmission to the local station LS1 until such time as another RF obstruction or random transmission errors causes a switching to the first antenna A1.

It should be noted that the order in which the antennas are switched in response to transmission errors is not critical. It should also be noted that the transaction sequence of FIG. 7 is not intended to accurately depict all transactions occurring during the relevant time interval and that transactions with other local stations would be occurring between those illustrated. Lastly, FIG. 7 illustrates that the polling packet 58 and polling-response packet 59 are temporally spaced-apart, which is the relationship maintained between any two packet transmissions in the network 10.

The protocol processors 52 have a number of additional functions which should be noted. In particular, the protocol processors 52 serve to assemble data packets for data transfer from the resources 14 associated with the base station 12 to the local stations and serve to disassemble data packets received from the local stations for data transfer to the resources 14. The protocol processors 52 are also programmed to periodically place empty polling-packets addressed to the various local stations associated with the network 10 into the RAM buffers 28 and to queue these polling-packets in the transmission queue. These packets (which contain no data) ensure that the local stations will be periodically queried as to whether they wish to transmit data to the base station 12.

Figure 8:
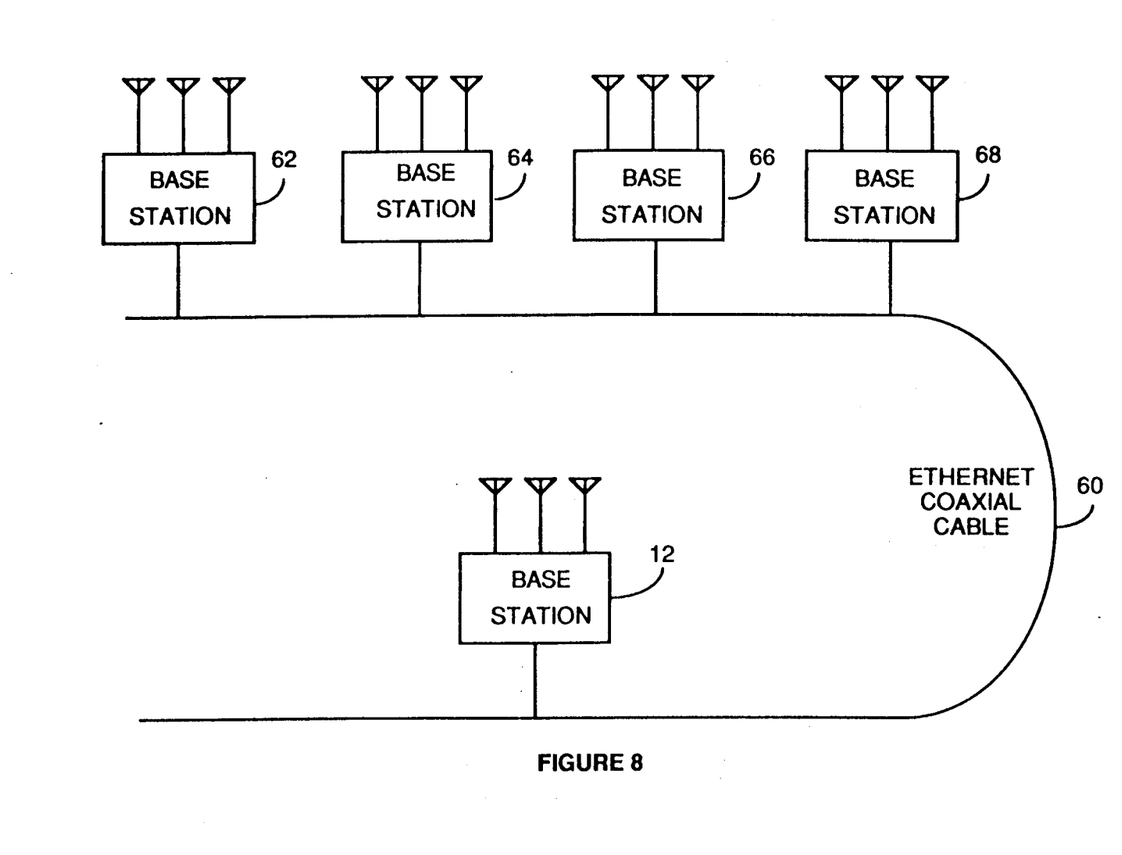

The protocol processors 52 also serve as interfaces to other local area networks. As illustrated in FIG. 8, the base station 12 is coupled by a conventional ethernet cable 60 to a variety of other base stations 62, 64, 66, 68 each serving its own local area network. Accordingly, the local stations associated with the base station 12 may access resources such as other computers, print servers and disk servers associated with these remote base stations 62, 64, 66, 68.

The local stations have a much simpler construction than the base station 12. The overall configuration and general operation of a typical local station LS1 will be described will reference to FIG. 5. Since many components of the local station LS1 are substantially identical to corresponding components in the base station 12, such components will be briefly described. The local station LS1 has a transmitting and receiving antenna 74 coupled to a transceiver 76 substantially identical to that of the base station 12. The transceiver 76 is capable of producing for each transmitted packet a header composed of PN code bits, of differentially encoding serial packet bits, of spread spectrum modulating the bits with the same PN code used by the base station 12, and of modulating the resultant bit stream onto an RF carrier of the same frequency as associated with the base station 12. In a receive mode, the transceiver 76 relies on the synchronizing code placed in the header of each poll-packet to properly lock onto the data stream of the poll-packet for purposes of collapsing the wide spectrum signal into a base band signal which can then be processed by an appropriate differential phase shift key demodulator.

Figure 5:
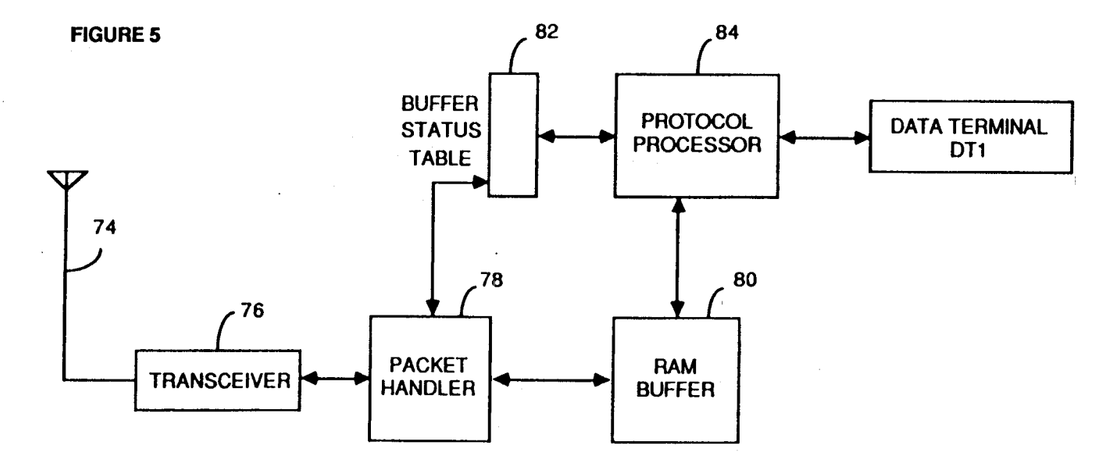
FIG. 5 diagrammatically illustrates the overall configuration of a typical local station.

The local station LS1 has a packet handler 78. In the receive mode, the packet handler 78 accepts a polling-packet decoded by the transceiver and stores the packet in a RAM buffer 80. During this process, the packet handler 78 checks whether the circuit number associated with the packet addresses the particular station and performs a cyclic redundancy test on the frame check sequence associated with the packet. If the polling packet is error-free and intended for the local station LS1, the packet handler 78 notes the location of the packet in a buffer status table 82 so that a protocol processor 84 can locate and further process the packet. In the event that a transmission error has occurred or if the packet is not intended for the local station LS1, no entry is placed in the buffer status table 82 and the packet is effectively discarded. Also, the protocol processor 84 examines and discards any duplicate packets stored by the packet handler 78 in the RAM buffer 80.

This covers the possibility that a poll-packet has been properly received from the base station 12, but an RF obstruction or transmission error affecting the corresponding poll-response packet causes the base station 12 to re-transmit the same poll-packet.

The protocol processor 84 also provides an appropriate interface with whatever data processing equipment uses the local station LS1. It may deliver data contained in poll-packets stored in the RAM buffer 80 to the processing equipment or may assemble data packets from digitized data provided by the data processing equipment for storage in the RAM buffer 80 and subsequent transmission according to a transmission queue maintained by the local station LS1.

It should be noted that upon successful receipt and storage of a polling packet, the packet handler 78 queries the buffer status table 82 to locate the next packet which must be transmitted to the base station 12. If no data needs to be transmitted, the packet handler 78 arranges for an empty poll-response packet to be returned. Return of such a packet is important, as absence of a poll-response packet causes the base station 12 to assume a transmission error has occurred and to reinsert the associated polling packet into the base station's transmission queue for subsequent re-transmission to the local station LS1.

A number of advantages associated with the local area network 10 should be noted. First, use of data packets as opposed to conventional frequency division multiplexing simplifies the addition of users to the network. In particular, use of data packets together with a single common RF carrier frequency considerably simplifies the encoding and decoding apparatus required in connection with the introduction of new equipment into the network. Also, since data transmission in computer system is characterized by bursts of data rather than continuous transmission, data packetting permits more effective use of the available system bandwidth, statistically allowing greater data transfer rates per user than available through assignment of distinct user transmission bandwidths. Lastly, data packetting in such a system inherently avoids interference between the systems own communications.

Second, spread spectrum modulation according to a local predetermined coding sequence reduces spectral energy density. In particular, if different tenants in a building use their own distinct local area networks, radio interference between the two may be critical because of the limited ability to physically separate the networks. Data packet transmission in distinct systems cannot for practical purposes be timed to avoid such radio interference and would in any event result in very restricted data transfer rates. Networks incorporating the spread spectrum data packets as taught herein can be readily assigned unique PN code sequences. Since spread spectrum signals have low spectral density, collapsing a particular network's transmission by spread spectrum demodulation to produce a comparatively narrow band signal will largely eliminate noise problems and radio interference due to transmissions in adjoining offices. Even in the coupled networks illustrated in FIG. 8, each local area network in close proximity is assigned a unique PN sequence to permit independent, simultaneous operation and consequently to increase data transfer rates.

Spread spectrum transmissions, however, are known to be strongly subject to what is sometimes referred to as the "near-far" problem. It is particularly difficult for a spread spectrum demodulator to discriminate undesired spread spectrum transmissions even though these are coded according to a different PN code sequence if such signals emanate from a nearby transmitter. This problem would manifest itself as a practical matter in the context of an office building if a local station in one network were markedly closer to a transmitting unit in another tenant's network than to its own base station. This "near-far" problem has been regarded as a serious impediment to use of spread spectrum transmission techniques in the interior of a building. This problem is made tolerable in the local area network of the invention by the data packetting and polling characteristics of the system. The transmission duty cycle of any local station is comparatively low (practically as small as several per cent), and consequently the likelihood of simultaneous transmissions from the base station associated with a particular local station and from a much closer local station associated with another tenant's network is comparatively small. Base stations, which will tend to have a duty-cycle in the order of 50%, can be conveniently located centrally in an office space thereby avoiding their involvement in near-far problems. Such placement of a base station is not an undue restriction on system flexibility, as in most instances the base station remains stationary while the local stations are most likely to be moved or expanded in number. Error correction protocols as described above can inherently handle the occurrence of interference due to near-far problems without undue restriction of data transfer rates.

The problem of multiple reflections from office walls, furnishing and the like is significantly reduced by spread spectrum modulating the data packets. Since minor phase differences significantly affect demodulation of a spread spectrum signal, decoding is apt to eliminate self-interference. Moreover, the occurrence of multiple reflections is exploited to reduce the likelihood of complete RF obstructions which are apt to occur in an office environment. The PN code synchronizer associated with each station automatically locks onto a signal path capable of containing data, preferably the strongest signal path.

The problem of decoding the spread spectrum transmissions given the very finite nature of data packet tansmissions and the significance of the loss of any transmitted data bits in digitized data transmission (unlike voice communications) is overcome by inserting an appropriate synchronizing sequence in each data packet.

It will be appreciated that a particular embodiment of the invention has been illustrated and that modifications may be made therein without departing from the spirit of the invention or the scope of the appended claims. In particular, the local area network described has been adapted for transmission of data only between any local station and the resources associated with the base station. This would be sufficient for purposes of operating dumb terminals from a host computer associated with the base station and accessing print and disk resources. However, it will be apparent to those skilled in the art that the base station and local stations can be readily adapted to introduce into the data packets information identifying a particular local station as the destination for data originating at another local station and adjusting base station operation accordingly. Also, although PN code sequences have been taught as means for spread spectrum modulation of data packets, other spread spectrum modulation techniques such as frequency shifting may be used but are not preferred.

I claim:

1. A wireless local area network for transfer of digitized data within a building as spread spectrum encoded packets transmitted through air, the network being adapted to respond to physical obstruction of transmission paths by objects displaced within the building, the network comprising:

a multiplicity of stations including a base station and a plurality of local stations;

each of the multiplicity of stations comprising means for transmitting digitized data through air in the form of packets on electromagnetic carriers, including means for spread spectrum modulating each packet prior to transmission according to a pseudo-random noise code;

each of the multiplicity of stations comprising means for receiving digitized data transmitted through air in the form of packets on electromagnetic carriers, including spread spectrum demodulation means for spread spectrum demodulating the received packets;

the base station comprising means regulating transmission of packets by the multiplicity of network stations such that all packets transmitted by the multiplicity of stations are transmitted through air temporally spaced-apart relative to one another, the means regulating transmission of packets causing the transmitting means of the base station to transmit polling packets through air at spaced-apart intervals, each of the polling packets requesting transmission of a packet by one of the local stations identified by the polling packet, each of the local stations transmitting a packet, through air, only in response to receipt of a polling packet requesting transmission by the local station:

the base station further comprising:

a. a plurality of spaced-apart antennas, the base station using only one of the plurality of antennas at any given time to transmit and receive packets, b. means for detecting errors in transmission of packets between the base station and each of the local stations, c. transmission gating means for changing the antenna used by the base station to another of the antennas, and d. control means for actuating the transmission gating means to change the antenna used by the base station to transmit packets to and receive packets from any one of the local stations to another of the antennas in response to detection of errors in transmission of packets between the base station and the one of the local stations thereby switching to an alternative transmission path in response to transmission errors arising from physical obstruction by an object of a transmission path used by the base station to transmit and receive packets from the one of the local stations.

2. A local area network as claimed in claim 1 in which the control means associate one of the antennas with each of the local stations for transmission of packets from the base station to the local station, the control means record data identifying which of the antennas is associated with each local station and actuate the transmission gating means in response to the recorded data to transmit packets from the base station to each local station with the associated antenna, and the control means change the recorded data to associate a different one of the antennas with any one of the local stations in response to detection of errors in transmission of packets between the base station and the local station.

3. A local area network as claimed in claim 1 in which the control means record the number of error-free transmissions of packets between the base station and any one of the local stations occurring between successive errors in transmission of packets between the base station and the local station and cause the transmission gating means to change the antenna used by the base station to transmit packets to the local station to another of the antennas whenever the number of error-free transmissions drops below a predetermined value.

* * * * *